Sheet 1 - 2 Sheets.

C. H. McCormick

Mower.

No. 822

Reissued Sep. 20, 1859.

C. H. McCormick.

Mower.

No. 822

Reissued Sep. 20, 1859

UNITED STATES PATENT OFFICE.

CYRUS H. McCORMICK, OF CHICAGO, ILLINOIS.

IMPROVEMENT IN REAPING-MACHINES.

Specification forming part of Letters Patent No. 5,335, dated October 23, 1847; Reissue No. 239, dated May 24, 1853; Reissue No. 637, dated December 21, 1858; Reissue No. 822, dated September 20, 1859.

DIVISION H.

*To all whom it may concern:*

Be it known that I, CYRUS H. McCORMICK, of Chicago, in the county of Cook and State of Illinois, have invented a new and useful Improvement in Reaping-Machines, of which the following is a full, clear, and exact description, reference being had to the accompanying drawings, making part of this specification, in which—

Figure 1:
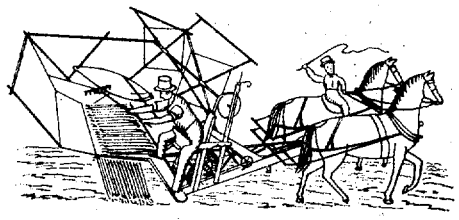
Figure 2:
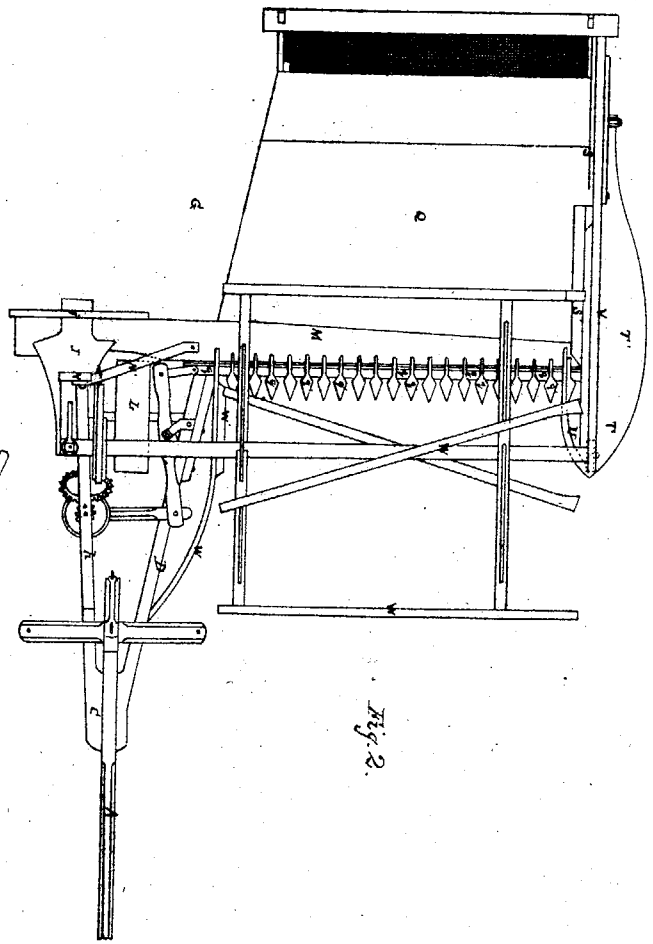
Figure 3:
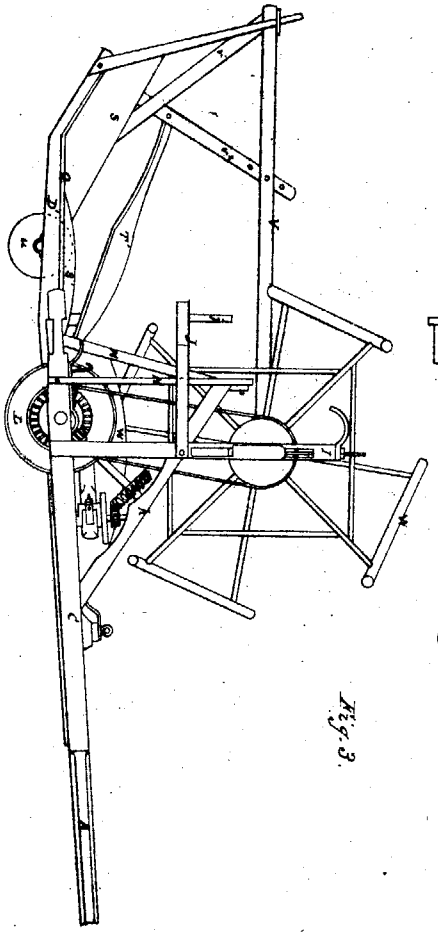
Figure 4:
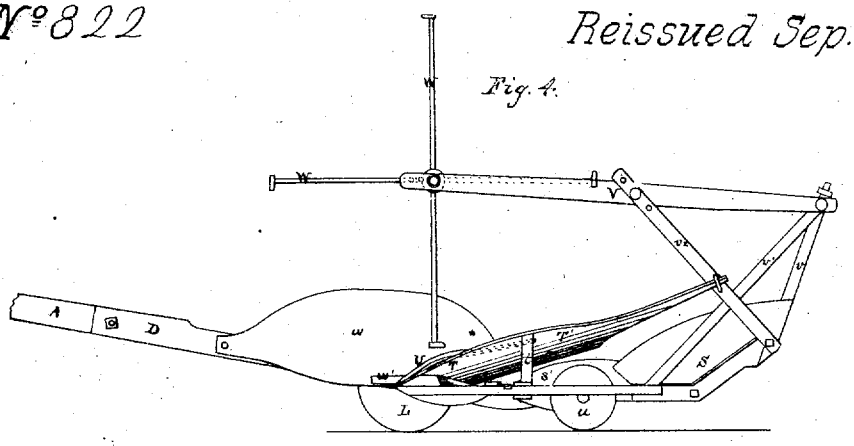
Figure 5:
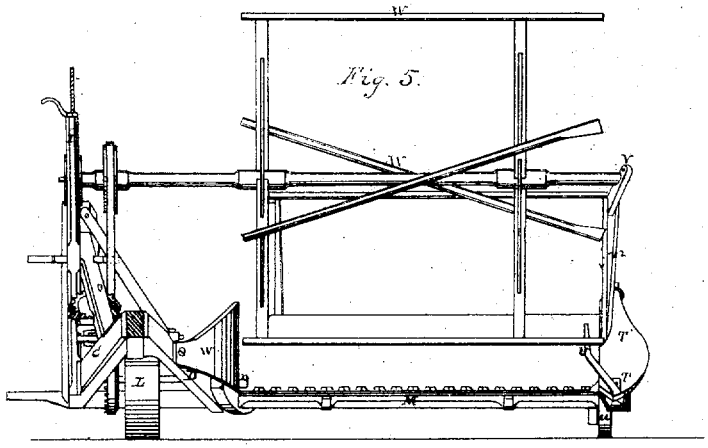
Figure 6:
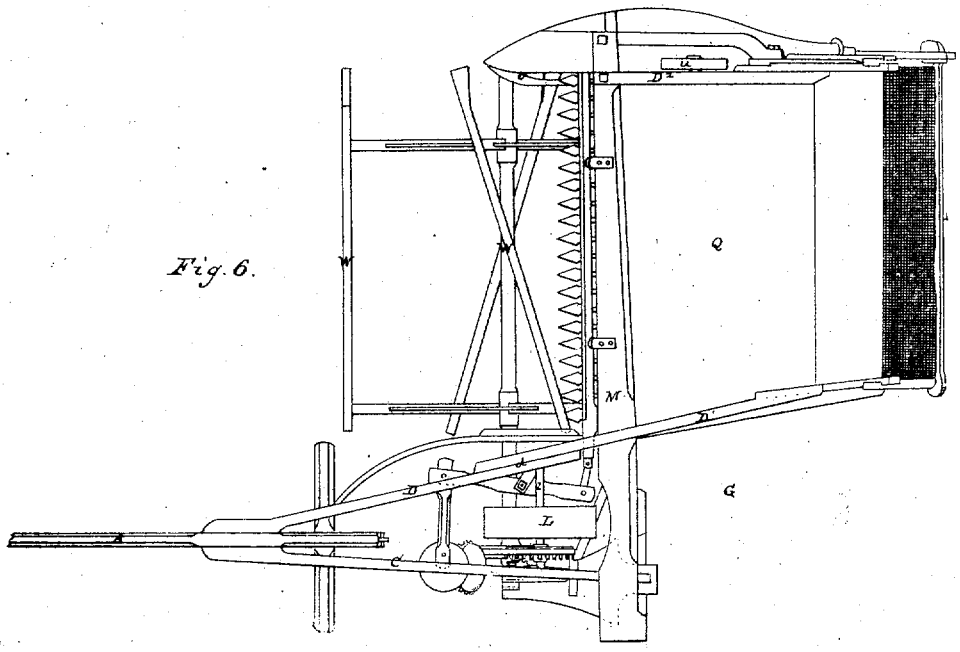

Figure 1 represents in perspective a side-draft-reel reaping-machine embracing my said improvement. Fig. 2 represents a plan of such a machine as seen from above. Fig. 3 represents an elevation of the inner side of the machine. Fig. 4 represents an elevation of the outer side of the machine. Fig. 5 represents an elevation of the front of the machine, and Fig. 6 represents a view of the under side of the machine.

That side of the machine to which the horses are attached, and which runs next the stubble, I call the "inner" side, and the opposite side, which runs next the uncut grain, I call the "outer" side of the machine.

The reaping-machine represented in the accompanying drawings is constructed with a low and nearly flat main frame supported on wheels. The main beam of this frame is what is called the "finger-piece" or "finger-beam." That portion of the frame which contains the gearing is connected to the inner portion of the finger-beam, while that portion of the frame which supports the platform is joined to the outer portion of the finger-beam, which likewise supports the cutting apparatus and the divider. At the outer side of reaping-machines having such a flat frame it has been customary to support the end of a reel by means of a post planted on or near the end of the finger-beam and supported by braces, such a post being in front of the axis of the wheel which supports that side of the machine. The weight of that post and of the end of the reel upheld by it, together with the weight of the divider and of the cutting apparatus, produced such a preponderance of weight on the front outer corner of the frame as to cause the adjacent corner of the platform, the outer end of the cutting apparatus, and the point of the divider to droop, which made it difficult to avoid cutting the grain lower at the outer than at the inner end of the cutter, and gave the point of the divider more tendency to run into the sides of hillocks and ridges. This drooping of the outer corner of the platform also tended to make the cut grain crowd against the outside of the platform, rendering it more difficult to be seized and removed by the raker, whose labor was further enhanced by having to pull the grain up the ascent from the drooping corner toward the place of discharge.

To overcome these difficulties is one object of my invention, which consists in removing the post for the support of the reel and arranging upon a low flat frame an arm or beam, by the front end of which the reel is supported, and the rear end of which rests on legs or struts rising from the rear portion of the main frame and behind the axis of the grain-wheel, the weight of the struts and of the rear end of the arm thus arranged tending to counterbalance the weight on the corner of the frame in front of them, and in a corresponding degree to prevent the outer front corner of the platform and the divider from drooping. By reason of the removal of the reel post or standard and the support of the reel by means which leave an open gathering-space for the free entrance of the outward-leaving grain above the divider and the outside of the main frame and of the platform resting thereon the gathering of the grain upon the platform is facilitated and the efficiency of the machine is increased and the tendency to sag of the front outward corner of the frame is lessened. The support of the reel, therefore, by means of an arm extending from the rear portion of the outside of a flat and low frame is an important improvement in this kind of reaping-machine, and gives it, in addition to the superiority in other respects, many of the advantages in the support of the reel, considered merely as a support, which are possessed by the class of high and ponderous frames with great vertical strength and stiffness, of which Bell's machine is an example, and which support arms at their front for carrying the reel, such arms projecting out on a level, or thereabout, with the top of the frame, in contradistinction to the plan I have contrived of supporting the reel at the requisite height by an arm projecting from the rear of a low, light, flat frame.

In the drawings I have shown this improvement applied to a McCormick reaping-machine, but deem it unnecessary to describe in detail any more of that machine than is needful to a proper understanding of this improvement.

In the accompanying drawings, M represents a strong beam, called the "finger-piece" or "finger-beam." It is the main beam of the frame, and the next in importance to it is a beam, D D′, which crosses the finger-beam to support the gearing and tongue in front and the platform in rear. Another beam, C, extends from the inner end of the finger-beam toward the rear of the tongue A, to which it and the front end of the beam D are fastened. The gearing is supported between the beams C and D.

The cutting apparatus is placed at the front side of the outer portion of the finger-beam M, and the platform Q is supported in the rear of that portion of the finger-beam by the beam D′ at its inner side, the finger-beam M at its front, and a beam, $D^2$, at its outer side. These beams thus arranged form a low frame, nearly flat, which is supported on wheels L and *u*.

At the outer end of the finger-beam and frame there is a divider, T, to separate the grain to be cut from that which is to be left standing, and to facilitate the delivery of the grain upon the platform.

The reel W has its bearings at the outer end in the front end of a beam, V, which is supported at its rear end by struts $v$ $v'$ $v^2$, rising from the rear outer portion of the frame. The inner end of the reel has its bearings in a sliding box in a standard, I, rising from the inner side of the frame.

What I claim under this patent as my invention is—

The combination of the reel-support at the rear part of the outer side of the platform with the low flat frame and the divider, arranged substantially as described.

In testimony whereof I have hereunto signed my name.

C. H. McCORMICK.

In presence of—
P. H. WATSON,
JOHN S. HOLLINGSHEAD.